Aug. 1, 1944.         A. H. WOLFERZ              2,354,902
                   REMOTE POSITION INDICATOR
                      Filed Feb. 18, 1942
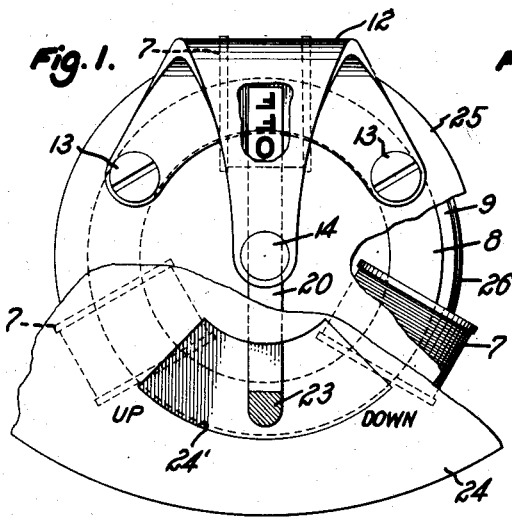
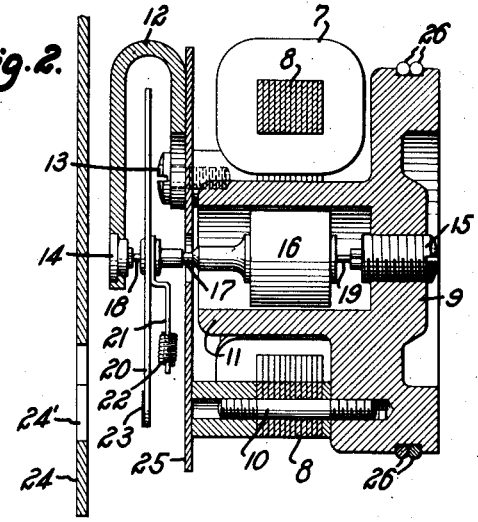
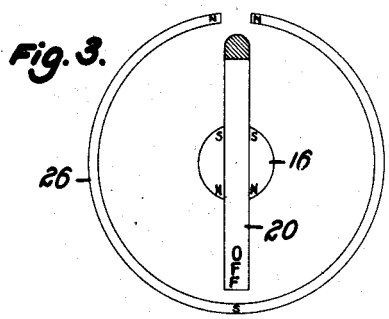
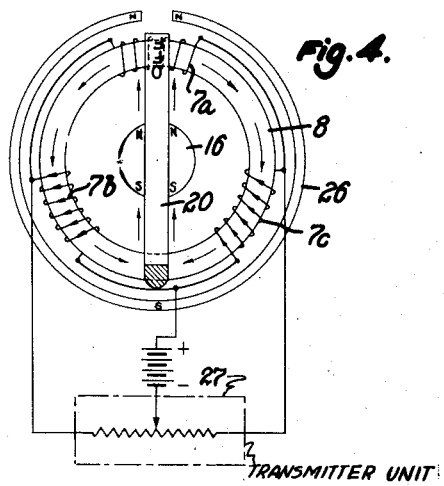
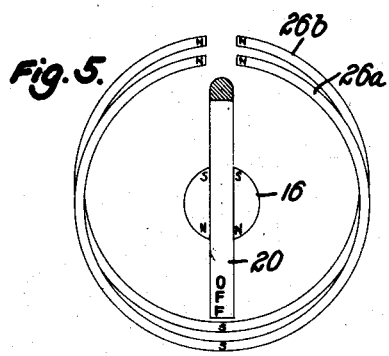
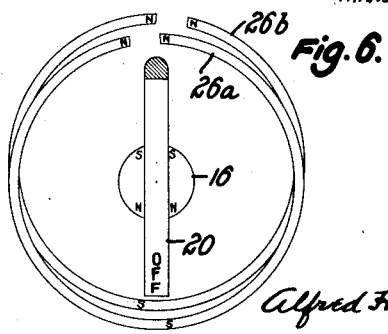
Inventor:
Alfred H. Wolferz,
By
Pierce & Scheffler,
Attorneys.

Patented Aug. 1, 1944

2,354,902

UNITED STATES PATENT OFFICE 2,354,902

REMOTE POSITION INDICATOR

Alfred H. Wolferz, Hillside, N. J., assignor to Weston Electrical Instrument Corporation, Newark, N. J., a corporation of New Jersey Application February 18, 1942, Serial No. 431,446

8 Claims. (Cl. 177—311)

This invention relates to position indicators which are employed as receivers in telemetric systems and more particularly to indicators provided with an auxiliary, magnetic system for indicating failure of the power source utilized for the operation of the indicators.

Telemetric systems of this class comprise a transmitter of the slide wire resistance type and a direct current source. The transmitter is divided into sections which are connected to the field coils of the receiver, and the movable arm of the said transmitter is mechanically connected to the member whose position is to be indicated at a remote point. A change in the position of the movable arm distributes the current in the various sections of the transmitter whereupon the field coils of the receiver establish an effective magnetic field having a definite angular direction and position. A permanent magnet rotor pivoted for axial rotation assumes a position depending upon the direction of the magnetic field produced by the field coils. The rotor carries a pointer which cooperates with a scale carrying suitable markings whereby the pointer position indicates the position of the remote member which actuates the transmitter.

System of this type are well suited for aircraft use to indicate the position of the various members comprising the landing gear. Preparatory to landing, the pilot may readily determine that his landing gear is in proper position and devote his complete attention to other operations forming part of the landing sequence. Inasmuch as the rotor of the receiver is not normally biased, the pointer may assume any position upon removal of the main magnetic field as may happen upon failure of the power source. It is apparent, therefore, that such failure of the system should be brought to the pilot's attention to prevent his unsuspecting reliance upon a misleading indication.

A satisfactory check system comprises an auxiliary, permanent magnet of relatively feeble strength so oriented with respect to the magnetic poles of the rotor, that the pointer assumes a position beyond the normal operating range upon removal of the main magnetic field. Under such condition the tail of the pointer, which is normally hidden under the scale plate and which may be of a special form, color or marking, moves into full view of the pilot. An auxiliary magnet made according to the invention provides a simple and economical means for indicating the failure of the power source. The construction also offers a distinct advantage which lies beyond the possibility of present devices of this type, as will be pointed out hereinbelow.

The angular rotation of the pointer is limited to a definite range which is conveniently defined by a suitable opening in the scale plate. In order to make the receivers interchangeable in use, it is essential that all units have the same range of deflection, yet the many factors which enter into the manufacture and assembly of the instruments result in a wide variation in deflection. To overcome this, each unit is designed to produce a somewhat greater deflection than is ultimately required and each unit may then be adjusted by a partial demagnetization of the rotor. It is apparent that such an adjustment must be carefully undertaken by a skilled operator for if the rotor is demagnetized beyond the critical point, the deflection will fall short of the desired range necessitating remagnetization of the rotor and reassembly of the instrument.

An object of this invention is the provision of a telemetric receiver provided with a power failure indicator of simple and economical construction and positive operation.

An object of the invention is to provide a telemetric receiver unit including an auxiliary magnet system that is adjustable to control, and independently of each other, the alarm position of a power failure indicator and the deflection range of the receiver unit.

An object of this invention is the provision of a remote receiver unit in which an auxiliary, permanent magnet system of split ring construction is adjustably mounted on the base of the unit.

An object is to provide a receiver unit including two permanent magnets of split ring construction, said magnets being adjustable relative to each other to control the deflection range of the unit.

An object is to provide a receiver unit comprising a plurality of field coils mounted on a stator, a permanent magnet rotor rotatable within the stator and a pair of split-ring, permanent magnets each adjustably mounted on the stator structure, whereby the rotor may be biased to assume a desired position when no current flows through the field coils and the deflection range of the instrument may be adjusted without demagnetization of the rotor.

These and other objects and advantages will be apparent from the following description when taken with the accompanying drawing in which:

Figure 1 is a fragmentary plan view of a telemetric receiver unit embodying the invention;

Figure 2 is a central cross-sectional view of the unit shown in Figure 1;

Figure 3 is a schematic plan view showing the magnetic elements which constitute the power failure indicator;

Figure 4 is a schematic circuit diagram of the telemetric system; and

Figures 5 and 6 are schematic plan views similar to Figure 3 but showing two auxiliary magnets in different relative positions.

Referring now to Figures 1 and 2, the receiver unit comprises a field structure composed of three field coils 7, symmetrically spaced on a stator 8 which is preferably made of soft iron laminations. The field structure is secured to a non-magnetic base 9 by means of screws 10, the base having an integral cylindrical extension 11 which forms a chamber for the movable element of the receiver. An upper bridge 12 is also secured to the base by screws 13 and carries a jeweled bearing 14, the other bearing 15 being centrally threaded in the base. The movable element comprises a transversely magnetized rotor 16 of high coercive force, permanent magnet material mounted on a staff 17 that includes pivots 18, 19 which operate in the bearings 14, 15 to permit relatively frictionless rotation of the rotor. Attached to the rotor staff 17 are the flat pointer 20 and the balancing arm 21 which carries the adjustable weight 22. The normally active section of the pointer may be provided with a colored tip 23 and the other, normally inactive section may carry a suitable warning symbol or legend such as the word "Off."

Telemetric receiver units such as so far described are frequently mounted within a single case in proper disposition behind a scale plate 24 that has an aperture or window opening 24' for each unit, and the individual units may be provided with a thin circular plate 25 that forms a background to facilitate instant observance of the pointer position. During normal operation, that is, when the field coils 7 are energized from the transmitter unit, the active pointer tip 23 is visible through its associated window opening 24' to provide an indication of the exact position of the remote member that actuates the transmitter. The particular unit that is shown in Figure 1 is intended for use with some remote member, such as the landing gear of an aircraft, that should be positioned in either of two end positions, and these end positions are indicated by the legends "Up" and "Down" on the plate 24 at the opposite ends of the arcuate opening 24'.

The deflection ranges of all receiver units for a particular use should be identical for a given flux developed by the field coils as a reduced deflection raises an uncertainty in the observer's mind as to the true meaning of the pointer position while an excessive deflection conceals the pointer from view. It has been the practice to adjust the deflection range of the receiver unit by a partial demagnetization but, according to this invention the auxiliary, permanent magnet system includes relatively movable members that are adjustable to control the normal deflection range of the pointer.

As illustrated in Figure 2, a preferred form of auxiliary magnet system comprises a pair of split rings 26 that fit snugly into a circumferential groove in the base 9 and are retained in any desired positions of individual angular adjustment by the resiliency or spring action of the rings. The rings are formed from a magnetic wire and are permanently magnetized to produce diametrically opposed magnetic poles as represented by the symbols "N" and "S" in the schematic view, Figure 3. A single ring 26 is shown in Figure 3 as only one magnetized ring is required to provide the desired warning signal, and that ring could be a complete ring or annulus. The split ring construction is preferable, however, as it simplifies the mechanical construction of a generally ring-form magnet that is supported for angular adjustment about the axis of the magnetic rotor 16.

Assuming no current through the field coils 7, the magnetized rotor 16 will be controlled only by the magnetic ring 26 and will take up the position illustrated in Figure 3, that is, the rotor 16 will turn to bring its magnetic axis into line with the diametric flux path between the magnetic poles of the ring 26. When, as shown, the "Off" signal of the pointer 20 is diametrically opposite its normally active symbol 23, a pole of the magnet ring 26 is preferably diametrically opposite the center of the window opening 24' through which the active symbol 23 is displayed under normal operating conditions.

The range-adjusting function of the twin magnetized rings 26 of Figure 2 will be apparent from a consideration of Figures 4, 5 and 6. The electrical circuit of the telemetric system, including the transmitter unit 27, is illustrated in Figure 4. The magnetic strength of the auxiliary magnetic ring or rings 26 is of low magnitude and is readily overcome by the magnetic field developed by the field coils 7. Examination of the circuit shows that the field coils 7b and 7c produce equal opposed magnetic flux fields in the stator as indicated by the arrows when the transmitter is balanced, and that there is no current flow through the coil 7a. The magnetic rotor 16 therefore assumes the illustrated position in which its magnetic axis is in line with the return path of the resultant stator flux, and the opposite magnetic poles of the rotor and stator are in close proximity. This brings the active tip 23 of pointer 20 into view in the window opening 24' and, as shown, at a central position in the opening 24'. This condition corresponds to an intermediate position of adjustment of the remote member, not shown, that adjusts the transmitter unit 27.

The auxiliary permanent magnet system 26 does not exert any turning influence upon the rotor 16 when the magnetic axes of the rotor 16 and the ring or rings 26 are in exact alinement at the balance position of the transmitter unit, Figure 4. Any unbalance of the transmitter unit alters the main flux field of the stator assembly, and the rotor 16 assumes a new position corresponding thereto. Upon deviation of the rotor 16 from the exact balance position of Figure 4, a repelling force is set up between the like magnetic poles N of the rotor 16 and the auxiliary magnet or magnets 26, and this repelling force increases the amount of rotation of the moving system. Consequently, the deflection range of the rotor is somewhat more than that which would obtain if the auxiliary magnetic system 26 were absent. It is apparent that the net finite amount of this increased deflection is proportional to the magnetic strength of the auxiliary permanent magnet system of the stator, and that the deflection range of the moving system may be adjusted by varying the effective magnetic strength of the auxiliary magnetic system.

Referring now to Figures 5 and 6 in which the two magnetized split rings 26a, 26b are shown as axially displaced for clarity of illustration, the net effect of two identical rings with like magnetic poles in exact juxtaposition, Figure 5, will be substantially twice that of either of the individual rings, and the rotor 16 will turn, upon a failure of the power supply to the field coils 7, to aline the magnetic axes of the rotor and the magnetic rings 26a, 26b. The simultaneous rotation of both rings in either direction from the illustrated positions will shift the magnetic axis of rings 26a, 26b and thereby alter the warning position of the rotor 16 and pointer 22. The effective magnetic strength of the magnetized rings 26a, 26b may be altered by adjusting the rings with respect to each other, and this adjustment of magnetic strength may be made without shifting the magnetic axis by displacing the rings 26a, 26b in opposite directions, as shown in Figure 6. The individual flux paths of the magnetized rings are displaced angularly with respect to each other, and the resultant flux field is reduced in magnitude without changing the direction of the resultant flux path. The standardization of the deflection range is thereby effected without demagnetizing any of the magnetized elements of the assembly and without altering the alarm position of the pointer.

It is broadly new in telemetric receiver units, so far as is now known, to employ an auxiliary magnetized system that may be adjusted to control both the warning signal position of the indicator element and the normal deflection range of the moving system. It is apparent that other types of auxiliary permanent magnet assemblies may be designed to afford an independent control of the angular disposition of the magnetic axis and of the effective magnetic strength of the assembly, and that various modifications of the illustrated constructions fall within the spirit of my invention as set forth in the following claims.

I claim:

1. In a telemetric receiver unit, a stator element and a freely rotatable rotor element, one element being a transversely magnetized permanent magnet and the other comprising an electromagnetic system for developing a magnetic field that rotates in accordance with the displacement of a remote element, said permanent magnet element being within the field developed by the other element, an auxiliary permanent magnet system of ring form, and means supporting said magnet system for continuous progressive adjustment about the axis of said rotor element throughout an angular range of substantially more than the normal deflection range of said rotor element to establish a permanent magnet field superposed upon the field developed by said other element.

2. In a telemetric receiver unit, the invention as set forth in claim 1 wherein said unit includes a base of non-magnetic material, and said permanent magnet system includes members adjustable with respect to each other to control the effective magnetic strength of said permanent magnet system.

3. In a telemetric receiver unit, the invention as set forth in claim 1 wherein said unit includes a base of non-magnetic material, and said permanent magnet system includes a ring form magnet angularly adjustable to determine the position into which said rotor moves during periods when said electromagnetic system is not energized.

4. A telemetric receiver comprising a base, a plurality of field coils supported by said base and adapted to be energized for producing a diametric magnetic field varying in angular direction in response to the variation of the indication to be transmitted, a permanently magnetized rotor having diametrically opposite magnetic poles and adapted for angular rotation by the magnetic flux produced by the field coils; a pointer attached to the rotor to indicate the angular position of said rotor with reference to a suitable scale, a power failure magnet having diametrically opposite magnetic poles to restore the rotor to a definite zero position when the field coils of the receiver are not energized, and means mounting said power failure magnet on the receiver base for continuous relative adjustment thereof throughout the entire 360 degrees.

5. The invention as recited in claim 4 wherein the power failure magnet comprises a split ring of magnetized wire mounted circumferentially on the receiver base and adjustably retained on said base by the spring action of the wire.

6. A telemetric receiver comprising a plurality of field coils adapted to be energized for producing a diametric magnetic field of varying angular direction, a permanently magnetized rotor having diametrically opposite magnetic poles and mounted for angular rotation in response to the magnetic field produced by the field coils, a pointer secured to the rotor and cooperating with a suitable scale, and a power failure magnet comprising two split rings of magnet wire adjustably mounted on the receiver, said rings being also adjustable relative to each other to thereby vary the effective magnetic strength of said power failure magnet for restoring the rotor to a definite zero position upon removal of the field flux.

7. In a telemetric receiver, the combination with a plurality of field coils adapted to provide a rotatable magnetic flux field and a permanently magnetized rotor adapted to assume a position corresponding to the direction of the field flux, of an auxiliary magnetic system for superposing a permanent magnet field upon the field provided by said coils; said auxiliary magnetic system including a pair of permanent magnets, and means supporting said magnets for individual angular adjustment about the axis of the magnetized rotor, whereby the strength of the permanent magnet field and the angular arrangement of its magnetic axis with respect to said rotor may be varied by the angular adjustment of said magnets.

8. In a telemetric receiver, the combination with a plurality of field coils adapted to provide a rotatable magnetic flux field, and a permanently magnetized rotor pivotally supported for movement to assume a position corresponding to the direction of the field flux, of a pair of radially split magnetized ring members, and means supporting said members for individual angular adjustment about the axis of the rotor.

ALFRED H. WOLFERZ.